(12) United States Patent
Hirota et al.

(10) Patent No.: US 11,915,884 B2
(45) Date of Patent: Feb. 27, 2024

(54) ELECTROLYTIC CAPACITOR

(71) Applicant: Panasonic Intellectual Property Management Co., Ltd., Osaka (JP)

(72) Inventors: Kei Hirota, Okayama (JP); Keita Uenaka, Osaka (JP); Yukihiro Shimasaki, Hyogo (JP); Hiroki Imamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 47 days.

(21) Appl. No.: 17/597,671

(22) PCT Filed: Jul. 31, 2020

(86) PCT No.: PCT/JP2020/029370
§ 371 (c)(1),
(2) Date: Jan. 18, 2022

(87) PCT Pub. No.: WO2021/024926
PCT Pub. Date: Feb. 11, 2021

(65) Prior Publication Data
US 2022/0277901 A1 Sep. 1, 2022

(30) Foreign Application Priority Data
Aug. 8, 2019 (JP) ................ 2019-146793

(51) Int. Cl.
*H01G 9/042* (2006.01)
*H01G 9/15* (2006.01)

(52) U.S. Cl.
CPC ............ *H01G 9/0425* (2013.01); *H01G 9/15* (2013.01)

(58) Field of Classification Search
CPC ............................. H01G 9/0425; H01G 9/15
See application file for complete search history.

(56) References Cited

U.S. PATENT DOCUMENTS

| 6,212,064 | B1 | 4/2001 | Aoki et al. |
| 2006/0215352 | A1 | 9/2006 | Take et al. |
| 2008/0247120 | A1 | 10/2008 | Mori et al. |

(Continued)

FOREIGN PATENT DOCUMENTS

| JP | 11-297574 | 10/1999 |
| JP | 2006-269570 | 10/2006 |

(Continued)

OTHER PUBLICATIONS

International Search Report of PCT application No. PCT/JP2020/029370 dated Oct. 13, 2020.

*Primary Examiner* — Eric W Thomas
(74) *Attorney, Agent, or Firm* — Rimon, P.C.

(57) ABSTRACT

An electrolytic capacitor includes a capacitor element. The capacitor element includes an anode body, a dielectric layer that covers at least a part of the anode body, a solid electrolyte layer that covers at least a part of the dielectric layer, and a cathode lead-out layer that covers a part of the solid electrolyte layer. The cathode lead-out layer contains a carbon material and a first polymer including an acid group. The acid group includes at least one selected from the group consisting of a sulfone group, a carboxyl group, and a derivative of the sulfone group or the carboxyl group.

9 Claims, 1 Drawing Sheet

(56) References Cited

U.S. PATENT DOCUMENTS

| | | | |
|---|---|---|---|
| 2009/0089990 A1* | 4/2009 | Kawakubo | H01G 9/15 |
| | | | 29/25.03 |
| 2009/0195966 A1 | 8/2009 | Ozawa | |
| 2011/0051321 A1* | 3/2011 | Yamaguchi | H01G 9/028 |
| | | | 427/80 |
| 2012/0075774 A1 | 3/2012 | Matsuoka | |

FOREIGN PATENT DOCUMENTS

| | | |
|---|---|---|
| JP | 2008-027998 | 2/2008 |
| JP | 2008-311639 | 12/2008 |
| JP | 2012-069789 | 4/2012 |

* cited by examiner

ELECTROLYTIC CAPACITOR

This application is a U.S. national stage application of the PCT International Application No. PCT/JP2020/029370 filed on Jul. 31, 2020, which claims the benefit of foreign priority of Japanese patent application No. 2019-146793 filed on Aug. 8, 2019, the contents all of which are incorporated herein by reference.

TECHNICAL FIELD

The present invention relates to an electrolytic capacitor.

BACKGROUND

An electrolytic capacitor includes a capacitor element and an exterior body covering the capacitor element. Examples of the electrolytic capacitor include a solid electrolytic capacitor in which a conductive polymer or the like is used as a solid electrolyte. In this case, the capacitor element includes an anode body, a dielectric layer formed on the anode body, a solid electrolyte layer formed on the dielectric layer, and a cathode lead-out layer formed on the solid electrolyte layer. The cathode lead-out layer is electrically connected to a cathode lead terminal.

As a configuration of the cathode lead-out layer, for example, Unexamined Japanese Patent Publication No. 2008-27998 proposes that adhesion between a solid electrolyte layer containing a conductive polymer and a carbon layer is improved by adding an aromatic compound having a sulfonate group to the carbon layer so that equivalent series resistance (ESR) of an electrolytic capacitor is reduced.

SUMMARY

In the electrolytic capacitor of Unexamined Japanese Patent Publication No. 2008-27998, an effect of improving ESR (particularly, an effect of suppressing an increase in ESR in a high-temperature environment) is not sufficient, and further improvement is desired.

One aspect of the present invention relates to an electrolytic capacitor comprising a capacitor element. The capacitor element includes an anode body, a dielectric layer that covers at least a part of the anode body, a solid electrolyte layer that covers at least a part of the dielectric layer, and a cathode lead-out layer that covers a part of the solid electrolyte layer. The cathode lead-out layer contains a carbon material and a first polymer including an acid group. And the acid group includes at least one selected from the group consisting of a sulfone group, a carboxyl group, and a derivative of the sulfone group or the carboxyl group.

The increase in the ESR of the electrolytic capacitor including the solid electrolyte layer can be suppressed.

DESCRIPTION OF EMBODIMENT

[Electrolytic Capacitor]

An electrolytic capacitor according to an exemplary embodiment of the present invention includes a capacitor element. The capacitor element includes an anode body, a dielectric layer that covers at least a part of the anode body, a solid electrolyte layer that covers at least a part of the dielectric layer, and a cathode lead-out layer that covers a part of the solid electrolyte layer. The cathode lead-out layer contains a carbon material and a first polymer including an acid group. The acid group includes at least one selected from the group consisting of a sulfone group, a carboxyl group, and a derivative of the sulfone group or the carboxyl group.

Although a capacitor element is usually covered with a resin exterior body in an electrolytic capacitor including a solid electrolyte layer, air (particularly oxygen, or oxygen and moisture) easily enters inside the electrolytic capacitor by permeating the exterior body. When the air that has entered the electrolytic capacitor comes into contact with the solid electrolyte layer, a conductive polymer contained in the solid electrolyte layer may deteriorate.

In the capacitor element, at least a part of the solid electrolyte layer is covered with a cathode lead-out layer. The cathode lead-out layer usually includes a carbon layer. Since the carbon layer is in a state in which particulate carbon materials are aggregated, it is thought that a film quality is not dense. Thus, when air enters the electrolytic capacitor, the air easily permeates the carbon layer. And the air that has permeated the carbon layer may come into contact with the solid electrolyte layer to deteriorate the conductive polymer contained in the solid electrolyte layer. Such deterioration of the conductive polymer becomes particularly remarkable under a condition of high temperature and/or high humidity. When the conductive polymer deteriorates, resistance of the solid electrolyte layer increases, and thus ESR of the electrolytic capacitor increases.

In the electrolytic capacitor of the present exemplary embodiment, in the capacitor element, the carbon layer, which is included in the cathode lead-out layer covering at least a part of the solid electrolyte layer, contains the first polymer including the acid group in addition to the carbon material. The conductive polymer has a functional group that is easily positively charged (for example, a —S— group, a —NH— group, or the like), and the acid group of the first polymer may be bonded to this functional group of the conductive polymer. Meanwhile, since a polymer chain of the first polymer can be entangled with carbon particles, the first polymer may firmly adhere to the carbon material. Thus, the adhesion between the carbon material and the conductive polymer can be enhanced via the first polymer. Accordingly, a gas barrier property of the carbon layer is improved, and thus the permeation of the air is reduced. As a result, since an increase in resistance of the solid electrolyte layer can be suppressed, an increase in ESR in the electrolytic capacitor can be suppressed.

Since the first polymer is thermally stable as compared with its monomer, the enhancement of the adhesion between the carbon material and the conductive polymer is easily maintained even in a high-temperature environment. Thus, an effect of suppressing an increase in ESR even at a high temperature is obtained by including the first polymer.

The acid group is, for example, a sulfone group (—SO$_3$H) or a carboxyl group (—COOH), and is included into a monomer corresponding to a repeating unit of the first polymer. The acid group may be a derivative of a sulfone group and/or a carboxyl group. The derivative of the sulfone group and/or the carboxyl group includes an anion group in which a proton is dissociated from the sulfone group and/or the carboxyl group, and a salt of the anion group and a cation (for example, a sodium salt or the like). The derivative may be an ester of the acid group and alcohol.

In addition to the first polymer, the second polymer may be contained in the cathode lead-out layer. The second polymer can synergistically enhance the effect of suppressing the increase in ESR, or can impart other functions to the second polymer. Similarly to the first polymer, the second polymer may have an acid group or may not have an acid group. The second polymer may be, for example, water-soluble. Water-soluble polymers generally have polar groups and may be densely oriented by hydrogen bonding. Thus, since the water-soluble polymers have a small space for gas such as oxygen to diffuse, the gas hardly permeates the water-soluble polymers. Hence, an oxygen barrier property can be enhanced by adding the second polymer. As a result, since oxidation deterioration of the conductive polymer can be suppressed, the increase in ESR can be further suppressed.

Among the water-soluble polymers, a cellulose-based polymer and polyvinyl alcohol can be preferably used as the second polymer because the cellulose-based polymer and polyvinyl alcohol have a high oxygen barrier property. The cellulose-based polymer may include cellulose ethers and cellulose esters, and may include, for example, a derivative in which a hydroxyl group of glucose, which is a monomer that constitutes cellulose, is chemically modified, such as carboxymethyl cellulose or hydroxyethyl cellulose. The derivative of the cellulose-based polymer may have a higher-order structure, and particularly may include a fibril structure.

The cathode lead-out layer may have a two-layer structure of a first conductive layer that covers at least a part of the solid electrolyte layer and a second conductive layer that covers at least a part of the first conductive layer. In this case, the first polymer may be contained in at least the first conductive layer. This can enhance the adhesion between the solid electrolyte layer and the first conductive layer, and thus the increase in ESR can be suppressed. For example, the first conductive layer is a carbon layer, and the second conductive layer is a silver-paste layer.

Figure 1:
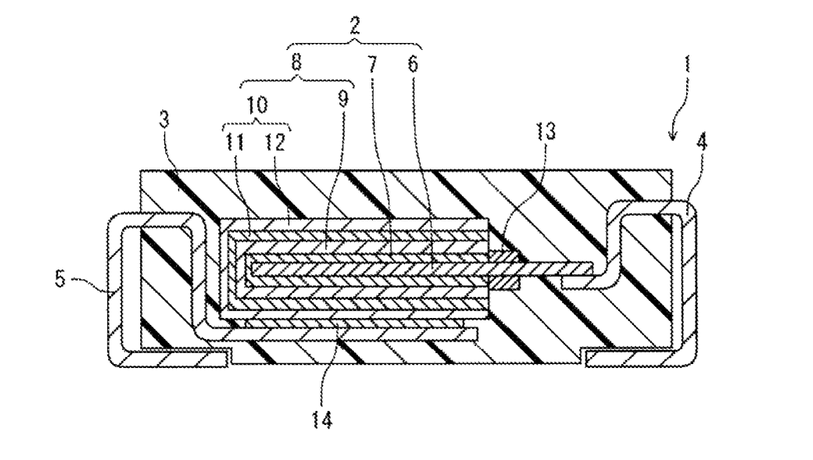
FIG. 1 is a sectional view schematically illustrating an electrolytic capacitor according to an exemplary embodiment of the present invention.

Hereinafter, a configuration of the electrolytic capacitor will be described more specifically with reference to the drawing as appropriate. FIG. 1 is a sectional view schematically illustrating a structure of the electrolytic capacitor according to one exemplary embodiment of the present invention. In the shown example, electrolytic capacitor 1 includes capacitor element 2, resin exterior body 3 that seals capacitor element 2, and anode lead terminal 4 and cathode lead terminal 5 at least parts of which are respectively exposed outside exterior body 3. Exterior body 3 has a substantially rectangular parallelepiped outer shape, and electrolytic capacitor 1 also has a substantially rectangular parallelepiped outer shape.

Capacitor element 2 includes anode body 6 that constitutes an anode part, dielectric layer 7 that covers anode body 6, and cathode part 8 that covers dielectric layer 7.

Anode body 6 includes a region facing cathode part 8 and a region not facing the cathode part. In the region of anode body 6 not facing cathode part 8, insulating separation layer 13 is formed in a portion adjacent to cathode part 8. Thus, the contact between cathode part 8 and anode body 6 is restricted. For example, insulating separation layer 13 covers a surface of anode body 6 in a belt shape. In the region of anode body 6 not facing cathode part 8, the other portion is electrically connected to anode lead terminal 4 by welding. Cathode lead terminal 5 is electrically connected to cathode part 8 through adhesive layer 14 made of a conductive adhesive.

Cathode part 8 includes solid electrolyte layer 9 covering dielectric layer 7, and cathode lead-out layer 10 covering solid electrolyte layer 9. Cathode lead-out layer 10 includes carbon layer 11 (first conductive layer) and silver-paste layer 12 (second conductive layer). Here, carbon layer 11 contains a carbon material and a first polymer. When carbon layer 11 contains the first polymer, since adhesion between carbon layer 11 and solid electrolyte layer 9 is enhanced, contact of solid electrolyte layer 9 with the air can be suppressed even though air enters exterior body 3. Thus, deterioration of the conductive polymer contained in solid electrolyte layer 9 is suppressed.

Hereinafter, the configuration of the electrolytic capacitor will be described in more detail.

(Capacitor Element 2)

Capacitor element 2 includes anode body 6 that constitutes the anode part, dielectric layer 7, and cathode part 8 including solid electrolyte layer 9. Cathode part 8 includes solid electrolyte layer 9 and cathode lead-out layer 10 covering solid electrolyte layer 9.

The electrolytic capacitor only needs to have at least one capacitor element 2, and may have one capacitor element 2 or a plurality of capacitor elements. The number of capacitor elements included in the electrolytic capacitor may be determined in accordance with application.

(Anode Body 6)

Anode body 6 can include a valve metal, an alloy containing a valve metal, a compound containing a valve metal, or the like. These materials can be used alone or in combination of two or more. As the valve metal, for example, aluminum, tantalum, niobium, and titanium are preferably used. Anode body 6 having a porous surface can be obtained, for example, by roughening a surface of a base material (such as a foil-shaped or plate-shaped base material) containing a valve metal by etching or the like. Alternatively, anode body 6 may be a molded body of particles containing a valve metal or a sintered body thereof. Here, the sintered body has a porous structure. That is, when anode body 6 is a sintered body, entire anode body 6 may be porous.

(Dielectric Layer 7)

Dielectric layer 7 is formed by anodizing the valve metal of the surface of anode body 6 by an anodizing treatment or the like. Dielectric layer 7 only needs to be formed to cover at least a part of anode body 6. Dielectric layer 7 is usually formed on the surface of anode body 6. Since dielectric layer 7 is formed on the porous surface of anode body 6, the dielectric layer is formed along inner wall surfaces of holes and hollows (pits) in the surface of anode body 6.

Dielectric layer 7 contains an oxide of a valve metal. For example, when tantalum is used as the valve metal, the dielectric layer contains $Ta_2O_5$, and when aluminum is used as the valve metal, the dielectric layer contains $Al_2O_3$. Dielectric layer 7 is not limited thereto and may be any one that functions as a dielectric material. When the surface of anode body 6 is porous, dielectric layer 7 is formed along the surface (including the inner wall surfaces of the holes) of anode body 6.

(Cathode Part 8)

(Solid Electrolyte Layer 9)

Solid electrolyte layer 9 that constitutes cathode part 8 contains a conductive polymer, but may also contain a dopant, an additive agent, or the like as necessary. The conductive polymers may be, for example, polypyrrole, polythiophene, polyaniline, polyacetylene, polyphenylene, polyphenylene vinylene, polyacene, and/or polythiophene vinylene, and derivatives of these polymers, for example. Solid electrolyte layer 9 can be formed, for example, by chemically and/or electrolytically polymerizing a raw material monomer on dielectric layer 7. Alternatively, the solid electrolyte layer can be formed by bringing a solution in which the conductive polymer is dissolved or a dispersion liquid in which the conductive polymer is dispersed into contact with dielectric layer 7. Solid electrolyte layer 9 only needs to be formed to cover at least a part of dielectric layer 7.

(Cathode Lead-Out Layer 10)

Cathode lead-out layer 10 that constitutes cathode part 8 includes carbon layer 11 and silver-paste layer 12. Cathode lead-out layer 10 is formed so as to cover at least a part of solid electrolyte layer 9.

(Carbon Layer 11)

Carbon layer 11 (first conductive layer) contains a carbon material and a first polymer, and has conductivity. Carbon layer 11 may contain a binder, an additive agent, and/or the like when necessary.

As the carbon material, conductive carbon particles are preferable. Examples of the carbon particles include graphite, graphene, carbon black, soft carbon, and hard carbon. As the graphite, a material having a graphite-type crystal structure is used, and either artificial graphite or natural graphite may be used. As the carbon particles, carbon nanotubes, carbon fibers, or the like, may be used. As the carbon particles, a fibrous carbon material, such as a carbon nanotube or a carbon fiber, may be a material cut into a suitable length (including a crushed material, or the like). These carbon particles may be used alone or in combination of two or more.

It is preferable that the carbon particles include scaly particles. In this case, it is easy to fill the carbon particles in carbon layer 11 in a layered overlapping state. The first polymer may be interposed between the overlapping scaly particles. As a result, carbon layer 11 and solid electrolyte layer 9 adhere closely to each other, and thus, air is less likely to enter. Thus, deterioration of the conductive polymer contained in solid electrolyte layer 9 is suppressed. A type of the carbon material that constitutes the particles is not particularly limited as long as the carbon material has a scaly form, but graphite, graphene, and the like easily take a scaly form, and the scaly particles are easily available.

An average aspect ratio of the carbon particles is, for example, 1.5 or more, and preferably 2 or more. When the average aspect ratio of the carbon particles is within such a range, flat particles, such as scaly particles, are contained in a large quantity. Thus, it becomes easy to fill carbon layer 11 with the carbon particles in an overlapping state. Accordingly, the carbon layer formed densely can further enhance an effect of suppressing the permeation of the air in carbon layer 11.

The average aspect ratio of the carbon particles can be determined from an electron micrograph of a cross section of carbon layer 11 as follows. First, a plurality of (for example, ten) carbon particles are arbitrarily selected, and maximum diameter D1 and maximum diameter D2 are measured for each carbon particle. Here, maximum diameter D2 is a maximum diameter in a direction perpendicular to a direction in which maximum diameter D1 is measured. An aspect ratio of each carbon particle is determined by dividing D1 by D2, and the average aspect ratio is calculated by further averaging the determined aspect ratios for the plurality of carbon particles.

An average particle size of the carbon particles is, for example, more than or equal to 0.05 μm, and preferably more than or equal to 0.1 μm. When the average particle size is within such a range, it is easy to densely fill carbon layer 11 with the carbon particles, and it is easy to ensure high conductivity. The average particle size of the carbon particles is preferably less than or equal to 10 μm, and more preferably less than or equal to 5 μm. In this case, the gaps between the carbon particles can be easily filled with silver, and thus the effect of suppressing the air permeation in carbon layer 11 can be further enhanced.

The average particle size of the carbon particles can be determined by arbitrarily selecting, in an electron micrograph of the cross section of carbon layer 11, a plurality of (for example, ten) carbon particles, measuring a particle size of each carbon particle, and averaging the measured particle sizes. As the particle size of the carbon particle, a diameter of a circle having the same area as an area of the cross section of the carbon particle observed in the electron micrograph is used.

Carbon layer 11 contains a first polymer having an acid group in addition to the carbon material. The conductive polymer contained in solid electrolyte layer 9 is easily positively charged by hole-doping. Specifically, for example, a —NH— group or a —N═ group contained in polypyrrole or polyaniline, or a —S— group contained in polythiophene is easily present in the form of a —NH$_2^+$— group, a —NH$^+$═ group, or a —S$^+$═ group, respectively. The acid group of the first polymer is bonded to these positively charged functional groups, and thus the first polymer may adhere to the conductive polymer. Further, a polymer chain of the first polymer adheres to a surface of the carbon particle so as to be entangled, and thus the first polymer may adhere to the carbon particle. As a result, the adhesion between the carbon particle and the conductive polymer is improved by interposing the first polymer. Accordingly, the permeation of the air from carbon layer 11 to solid electrolyte layer 9 is reduced, and an increase in resistance (that is, an increase in ESR of the electrolytic capacitor) due to the deterioration of the conductive polymer can be suppressed.

In the first polymer, the acid group may be a sulfone group (—SO$_3$H), a carboxyl group (—COOH), or a derivative thereof. The derivative includes an anion group in which a proton is dissociated from the acid group, a salt of the anion group and a cation, and an ester in which the acid group is reacted with an alcohol. The acid group is introduced into a monomer corresponding to a repeating unit of the first polymer. The number of the acid group contained in the first polymer may be more than or equal to 50 or may be more than or equal to 85 with respect to 100 monomers.

A content ratio of the first polymer may be more than or equal to 1 part by mass, more than or equal to 2 parts by mass, more than or equal to 5 parts by mass, or more than or equal to 10 parts by mass with respect to 100 parts by mass of the carbon material. When the first polymer is contained in a content ratio of more than or equal to 1 part by mass with respect to 100 parts by mass of the carbon material, the adhesion between the cathode lead-out layer (carbon layer) and the solid electrolyte layer is improved. Thus, the increase in ESR of the electrolytic capacitor can be suppressed. On the other hand, when the content ratio of the first polymer is excessively large, a viscosity of a carbon paste used for forming the carbon layer increases. Further, the resistance of the carbon layer increases, and thus the effect of suppressing the increase in ESR may be reduced. Thus, a content ratio of the first polymer may preferably be less than or equal to 5000 parts by mass with respect to 100 parts by mass of the carbon material such that workability due to application of the carbon paste is not impaired and the effect of suppressing the increase in ESR is not reduced. A content ratio of the first polymer may be less than or equal to 1000 parts by mass, or less than or equal to 100 parts by mass, with respect to 100 parts by mass of the carbon material.

A content of the first polymer may range from 1 parts by mass to 5000 parts by mass, inclusive, from 2 parts by mass to 1000 parts by mass, inclusive, from 5 parts by mass to 100 parts by mass, inclusive, or from 10 parts by mass to 100 parts by mass, inclusive, with respect to 100 parts by mass of the carbon material.

A weight average molecular weight of the first polymer ranges, for example, from 2,000 to 1,000,000, inclusive. By using the first polymer having the weight average molecular weight in such a range, carbon layer 11 and solid electrolyte layer 9 adhere to each other and the permeation of the air from carbon layer 11 to solid electrolyte layer 9 is reduced. Thus, the increase in ESR may be suppressed.

The first polymer may be a resin material.

As the first polymer, for example, as an example having a sulfone group, either a polymer having aromatic sulfonic acid in a monomer structure or a polymer having aliphatic sulfonic acid in a monomer structure can be used. Examples of the polymer having the aromatic sulfonic acid in the monomer structure include polystyrene sulfonic acid and a phenol sulfonic acid novolac resin. Examples of the polymer having the aliphatic sulfonic acid in the monomer structure include polyvinylsulfonic acid and polyallylsulfonic acid. Examples of the first polymer having the carboxyl group (or the derivative thereof) include acrylic resins such as polyacrylic acid, polymethacrylic acid, polymethyl acrylate, and polymethyl methacrylate, and polyethylene terephthalate.

As the first polymer, polyacrylic ethyl sulfonic acid, polyacrylic butyl sulfonic acid, polymethacrylic sulfonic acid, poly-2-acrylamide-2-methylpropane sulfonic acid, or the like may be used.

In addition to the first polymer, the second polymer may be contained in the carbon layer. The second polymer may be water-soluble. The water-soluble second polymer is easily bonded to another second polymer or the first polymer by hydrogen bonding, and easily has a dense structure by hydrogen bonding in the molecular chain. Thus, a space for gas such as oxygen to diffuse in the polymer is small, and the gas hardly permeates the polymer. Accordingly, an oxygen barrier property can be enhanced by adding the second polymer. As a result, since the oxidation deterioration of the conductive polymer is suppressed, the increase in ESR of the electrolytic capacitor can be further suppressed.

Examples of the second polymer having an excellent oxygen barrier property include a cellulose-based polymer and/or polyvinyl alcohol.

Examples of a derivative of the cellulose-based polymer include a higher-order structure, and particularly include a fibril structure. The use of fibrillated cellulose is preferable because not only the oxygen barrier property is enhance, but also thixotropy is imparted, and the carbon paste after application can be stabilized when the carbon layer is formed.

A weight average molecular weight of the second polymer ranges, for example, from 2,000 to 1,000,000, inclusive. A content ratio of the second polymer is not limited, but, considering workability, may be, for example, less than or equal to 10 parts by mass with respect to 100 parts by mass of the carbon material. Similarly to the first polymer, the second polymer may include an acid group. A content ratio of the second polymer may range from 5 parts by mass to 50 parts by mass, inclusive, from 5 parts by mass to 35 parts by mass, inclusive, from 8 parts by mass to 35 parts by mass, inclusive, or from 8 parts by mass to 32 parts by mass, inclusive, with respect to 100 parts by mass of the first polymer.

As the binder and the additive agent contained in carbon layer 11, publicly known components, each of which is to be used in a carbon layer of an electrolytic capacitor, can be used without particular limitation. Carbon layer 11 may contain a metal element such as silver.

An average thickness of carbon layer 11 ranges, for example, from 0.01 µm to 50 µm, inclusive. The average thickness can be determined, for example, by measuring, in an electron micrograph of the cross section of carbon layer 11, thicknesses of a plurality of (for example, ten) portions of carbon layer 11, and averaging the measured thicknesses in the plurality of portions.

(Silver-Paste Layer 12)

Silver-paste layer 12 (second conductive layer) contains, for example, silver particles and a binder. Silver-paste layer 12 can contain an additive agent and the like when necessary. Examples of the additive agent include publicly known additive agents to be used in a silver-paste layer.

The silver particles may contain other metal elements. A content proportion of the other metal elements in the silver particles is preferably less than or equal to 0.1 mass %.

A content proportion of silver in silver-paste layer 12 is, for example, more than 50 mass %, and preferably more than or equal to 70 mass %. When the content proportion of the silver is within such a range, high conductivity of silver-paste layer 12 is ensured, and thus a current collecting property from capacitor element 2 can be enhanced.

Silver-paste layer 12 may contain the first polymer and/or the second polymer described above.

The binder contained in silver-paste layer 12 is not particularly limited, but a cured product of a curable resin is preferable. Examples of the curable resin include thermosetting resins such as an epoxy resin.

(Exterior Body 3)

Exterior body 3 covers capacitor element 2. Usually, a part of lead terminal 4 and a part of lead terminal 5 are also covered with exterior body 3. Exterior body 3 is formed by sealing capacitor element 2 and the parts of lead terminals 4 and 5 with a resin material.

Exterior body 3 preferably contains a cured product of a curable resin composition, and may contain a thermoplastic resin or a composition containing the same. As the curable resin composition and the thermoplastic resin (composition), compositions to be illustrated below can be used.

In exterior body 3 made of a resin material, the resin material may deteriorate or may be damaged by a mechanical shock, and thus external air easily permeates exterior body 3 to enter inside the exterior body. According to the present exemplary embodiment, since the adhesion of the cathode lead-out layer (carbon layer) is improved by containing the first polymer, the gas barrier property of the cathode lead-out layer is high. Thus, the contact of solid electrolyte layer 9 with air can be suppressed (or reduced) even when exterior body 3 made of a resin material is used.

(Lead Terminals 4 and 5)

One end of each of lead terminal 4 and lead terminal 5 is electrically connected to capacitor element 2, and the other end thereof is drawn out of exterior body 3. In electrolytic capacitor 1, a part of each of lead terminal 4 and lead terminal 5 at the one end side is covered with exterior body 3 along with capacitor element 2. As lead terminals 4 and 5, a lead terminal to be used in electrolytic capacitors can be used without particular limitation, and for example, a lead terminal called a lead frame may be used. Examples of the material of lead terminals 4 and 5 include a metal such as copper or an alloy thereof.

[Method for Manufacturing Electrolytic Capacitor]

The above electrolytic capacitor is manufactured by a manufacturing method including a step of forming the dielectric layer so as to cover at least a part of the anode body, a step of forming the solid electrolyte layer so as to cover at least a part of the dielectric layer, and a step of forming the cathode lead-out layer on at least a part of the solid electrolyte layer. The step of forming the cathode lead-out layer includes a step of forming the carbon layer, and a step of forming the silver-paste layer on at least a part of the carbon layer. The method for manufacturing the electrolytic capacitor may further include, before the step of forming the dielectric layer, a step of providing the anode body. Further, the method for manufacturing the electrolytic capacitor may further include a step of electrically connecting the lead terminals to the capacitor element, and a step of covering the capacitor element and parts of the lead terminals with the exterior body (sealing step).

Hereinafter, each step will be described in more detail.

(Step of Providing Anode Body 6)

In this step, anode body 6 that constitutes the anode part is formed by a publicly known method in accordance with a type of anode body 6.

Anode body 6 can be provided, for example, by roughening a surface of a foil-shaped or plate-shaped base material containing a valve metal. The roughening only needs to form irregularities on the surface of the base material, and may be performed, for example, by etching (for example, electrolytically etching) the surface of the base material.

Alternatively, this step is not limited to the above case, and powder of the valve metal is molded into a desired shape (for example, a block shape) to obtain a molded body. Anode body 6 having a porous structure may be formed by sintering this molded body.

(Step of Forming Dielectric Layer 7)

In this forming, dielectric layer 7 is formed on anode body 6. Dielectric layer 7 is formed by anodizing anode body 6. The anodization can be performed by a publicly known method such as an anodizing treatment. The anodizing treatment can be performed, for example, by immersing anode body 6 in an anodizing liquid to impregnate the surface of anode body 6 with the anodizing liquid, and applying a voltage between an anode obtained by using anode body 6 and a cathode immersed in the anodizing liquid. As the anodizing liquid, for example, a phosphoric acid aqueous solution or the like is preferably used.

(Step of Forming Solid Electrolyte Layer 9)

In this step, solid electrolyte layer 9 is formed on dielectric layer 7. For example, a treatment liquid containing a conductive polymer is attached to anode body 6 on which dielectric layer 7 is formed, and is then dried to form solid electrolyte layer 9. The treatment liquid may further contain other components such as a dopant. As the conductive polymer, for example, poly(3,4-ethylenedioxythiophene) (PEDOT) is used. As the dopant, for example, polystyrenesulfonic acid (PSS) is used. The treatment liquid is, for example, a dispersion liquid or solution of the conductive polymer. Examples of a dispersion medium (solvent) include water, organic solvents, or mixtures thereof. Solid electrolyte layer 9 may be formed by chemically and/or electrolytically polymerizing a raw material monomer of the conductive polymer on dielectric layer 7.

(Step of Forming Cathode Lead-Out Layer 10)

In this step, cathode lead-out layer 10 is formed on solid electrolyte layer 9 by sequentially laminating carbon layer 11 and silver-paste layer 12.

(Step of Forming Carbon Layer 11)

In this step, carbon layer 11 is formed by attaching carbon paste to at least a part of solid electrolyte layer 9. Carbon layer 11 may be formed by further heating a coated film of the carbon paste formed on at least a part of solid electrolyte layer 9.

The carbon paste contains a carbon material, a first polymer, and a dispersion medium. As the dispersion medium, water, an organic medium, or a mixture thereof is used. The carbon paste can contain a binder, an additive agent, and/or the like when necessary. The carbon paste may further contain a second polymer.

Examples of the carbon material contained in the carbon paste include the material described for carbon layer 11. It is preferable that the carbon material include scaly carbon particles. An average aspect ratio and an average particle size of the carbon particles can be selected from the ranges described for carbon layer 11, respectively. Similarly, examples of the first and second polymers include the materials described for carbon layer 11.

The average aspect ratio and the average particle size of the carbon particles are dimensions measured for the carbon particles to be used in the carbon paste, respectively. The average aspect ratio of the carbon particles can be calculated in the same way as in the case of the average aspect ratio of the carbon particles contained in carbon layer 11, except that the average aspect ratio is determined from an electron micrograph of the carbon particles. The average particle size of the carbon particles is the 50% particle size D50 (that is, median size) in a volume-based particle size distribution obtained by using a laser diffraction/scattering particle size distribution analyzer.

The binder to be contained in the carbon paste is not particularly limited, and examples thereof include publicly known binders to be used for producing a carbon layer. As the binder, for example, a polymer binder, such as a thermoplastic resin (polyester resin or the like) or a thermosetting resin (polyimide resin, epoxy resin, or the like), is preferable.

The additive agent is not particularly limited, and examples thereof include publicly known additive agents to be used for producing a carbon layer. Examples of the additive agent include, for example, a dispersant, surfactant, antioxidant, preservative, base, acid, and/or the like.

Carbon layer 11 may be formed by attaching a carbon paste to at least a part of solid electrolyte layer 9 to form a coated film and then drying the coated film. After the coated film is formed, the coated film may be further heated.

The carbon paste only needs to be brought into contact with solid electrolyte layer 9, and, for example, anode body 6 including solid electrolyte layer 9 may be immersed in the carbon paste, or the carbon paste may be applied onto the surface of solid electrolyte layer 9 by using a publicly known coater or the like.

A temperature at which the coated film of the carbon paste is heated ranges, for example, from 150° C. to 300° C., inclusive.

(Step of Forming Silver-Paste Layer 12)

In this step, silver-paste layer 12 is formed on at least a part of carbon layer 11. Silver-paste layer 12 can be formed by attaching silver paste to at least a part of carbon layer 11. The silver paste can contain silver particles, a binder, a dispersion medium, and, when necessary, an additive agent. For the silver particles, the binder, and the additive agent, the description of silver-paste layer 12 can be referred to. The first polymer and/or the second polymer may be contained in the silver paste. Examples of the dispersion medium include water, an organic medium, and a mixture thereof.

Silver-paste layer 12 can be formed by drying and/or heating the coated film of the silver paste formed on at least a part of carbon layer 11. For example, when a thermosetting resin is used as the binder, silver-paste layer 12 is formed by heating the coated film of the silver paste to cure the binder.
(Step of Connecting Lead Terminals)

In this step, anode lead terminal 4 and cathode lead terminal 5 are electrically connected to capacitor element 2. The connecting of each lead terminal may be performed after capacitor element 2 is produced. The connecting of cathode lead terminal 5 to capacitor element 2 is performed after capacitor element 2 is produced, but the connecting of anode lead terminal 4 to anode body 6 may be performed at an appropriate stage of the step of producing capacitor element 2. For example, when the anode body having a porous structure is formed by sintering, a molded body molded into a desired shape is obtained while one end in the longitudinal direction of a rod-shaped anode lead terminal is embedded in the powder of the valve metal. The anode body having a porous structure, in which one end of the anode lead terminal is embedded, may be formed by sintering the molded body.

When a laminated body of a plurality of capacitor elements is used, anode lead terminal 4 can be connected to anode body 6 in the same way as described above. Cathode lead terminal 5 may be connected to a capacitor element in the same manner as described above, or one end of cathode lead terminal 5 may be connected to the laminated body of the plurality of capacitor elements in which cathode parts 8 are electrically connected to each other.
(Sealing Step)

In this step, capacitor element 2 is sealed with exterior body 3 by covering capacitor element 2 and parts of lead terminals 4 and 5 with exterior body 3. More specifically, after capacitor element 2 and lead terminals 4 and 5 are electrically connected, capacitor element 2 and parts of lead terminals 4 and 5 are covered with a resin that constitutes a resin exterior body, and thus, the sealing can be performed.

Exterior body 3 can be formed by using a molding technique such as injection molding, insert molding, or compression molding. Exterior body 3 can be formed, for example, by using a predetermined mold and filling predetermined portions thereof with a curable resin composition or a thermoplastic resin (composition) so as to cover capacitor element 2 and one ends of lead terminals 4 and 5. When the laminated body of the plurality of capacitor elements is used, the resin exterior body may be formed to cover the laminate body and parts of the lead terminals.

The curable resin composition may contain a filler, a curing agent, a polymerization initiator, a catalyst, and/or the like, in addition to the curable resin. Examples of the curable resin include epoxy resin, phenol resin, urea resin, polyimide, polyamideimide, polyurethane, diallyl phthalate, unsaturated polyester, and the like. The curable resin composition may contain a plurality of curable resins.

As the filler, for example, (inorganic and organic) insulating particles, fibers, and/or the like are preferable. Examples of an insulating material that constitutes the filler include insulating compounds (oxides, and the like) such as silica and alumina, glass, and mineral materials (talc, mica, clay, and the like). The resin exterior body may contain one type of these fillers, or may contain two or more types in combination. A content proportion of the filler in the resin exterior body ranges, for example, from 10 mass % to 90 mass %, inclusive.

As the thermoplastic resin, for example, polyphenylene sulfide (PPS), polybutylene terephthalate (PBT), or the like can be used. The composition containing the thermoplastic resin may contain the above-mentioned filler and the like in addition to the thermoplastic resin.

EXAMPLES

Hereinafter, the present invention is specifically described with reference to Examples and Comparative Examples, but the present invention is not limited to the following examples.

Examples 1 to 12

Electrolytic capacitor 1 shown in FIG. 1 was produced in the following manner, and characteristics thereof were evaluated.
(1) Production of Capacitor Element An aluminum foil (thickness: 100 μm) was provided as a base material, and a surface of the aluminum foil was subjected to an etching treatment to obtain anode body 6. Anode body 6 was immersed in a phosphoric acid solution (liquid temperature: 70° C.) having a concentration of 0.3 mass %, and a direct-current voltage of 70 V was applied for 20 minutes to form dielectric layer 7 containing aluminum oxide ($Al_2O_3$) on a surface of anode body 6. Thereafter, an insulating resist tape (separation layer 13) was attached to a predetermined portion of anode body 6.

An aqueous solution containing a pyrrole monomer and p-toluenesulfonic acid was prepared. A monomer concentration in this aqueous solution was 0.5 mol/L, and a concentration of p-toluenesulfonic acid was 0.3 mol/L. Anode body 6 on which dielectric layer 7 was formed and a counter electrode were immersed in the obtained aqueous solution, and electropolymerization was performed at 25° C. and a polymerization voltage of 3V to form solid electrolyte layer 9.

After a dispersion liquid (carbon paste) in which scaly natural graphite and the first polymer shown in Table 1 were dispersed in water was applied onto solid electrolyte layer 9, the solid electrolyte layer was heated at 200° C., and thus, carbon layer 11 was formed on the surface of the solid electrolyte layer. A proportion of the graphite particles in the carbon paste was set to 5 mass %.

Subsequently, after a silver paste containing silver particles and a binder resin (epoxy resin) was applied onto the surface of carbon layer 11, the binder resin was cured by heating the carbon layer, and silver-paste layer 12 was formed. Thus, cathode lead-out layer 10 including carbon layer 11 and silver-paste layer 12 was formed.

As described above, a plurality of capacitor elements 2 having different carbon layer compositions were obtained.
(2) Assembly of Electrolytic Capacitor Anode lead terminal 4, cathode lead terminal 5, and adhesive layer 14 were further arranged in capacitor element 2, and exterior body 3 was formed by using a resin containing silica particles as a filler. Accordingly, an electrolytic capacitor was produced.

Examples 13 to 19

In the preparation of the carbon paste, 6 parts by mass of the second polymer shown in Table 1 was added to 100 parts by mass of the carbon material in addition to the first polymer shown in Table 1 to obtain a carbon paste. The electrolytic capacitor was produced in the same manner as in Examples 1 to 12 except for the above preparation.

Examples 20 to 22

In the preparation of the carbon paste, in addition to the first polymer shown in Table 1 to obtain a carbon paste, the second polymer was added in parts by mass shown in Table 1 with respect to 100 parts by mass of the carbon material. The electrolytic capacitor was produced in the same manner as in Example 13 except for the above preparation.

Comparative Examples 1 and 2

In the preparation of the carbon paste, p-phenolsulfonic acid or p-toluenesulfonic acid was added as a low-molecular additive agent instead of the first polymer to obtain a carbon paste. The electrolytic capacitor was produced in the same manner as in Example 1 except for the above preparation.

Comparative Examples 3 and 4

In the preparation of the carbon paste, carboxymethyl cellulose (weight average molecular weight: 100,000) was added in a ratio shown in Table 1 instead of the first polymer to obtain a carbon paste. The electrolytic capacitor was produced in the same manner as in Examples 1 to 12 except for the above preparation.

Table 1 shows content ratios of the additive agents (first and second polymers, or low-molecular additive agents) in the carbon paste for each of the electrolytic capacitors of Examples 1 to 22 and Comparative Examples 1 and 2. Table 1 shows the content ratios of the first and second polymers in parts by mass with respect to 100 parts by mass of the carbon material. Table 1 also shows the molecular weights (weight average molecular weights) of the first and second polymers and the introduction amounts of acid groups contained in the first and second polymers (the number of acid groups per 100 monomers each corresponding to a repeating unit of the first and second polymer). In Table 1, the electrolytic capacitors of Examples 1 to 22 are A1 to A22, respectively. The electrolytic capacitors of Comparative Examples 1 and 2 are B1 and B2, respectively. In Examples 13 to 18 and 20 to 22 and Comparative Examples 3 and 4, an ammonium salt was used as carboxymethyl cellulose, and carboxymethyl cellulose having 30 acid groups (carboxy groups) per 100 monomers was used.

The electrolytic capacitors of Examples and Comparative Examples produced above were evaluated as follows.

[Evaluations]

An ESR value (mΩ) at a frequency of 100 kHz of the electrolytic capacitor was measured as an initial ESR value ($X_0$) (mΩ) by using an LCR meter for 4-terminal measurement under an environment of 20° C.

Subsequently, the electrolytic capacitor was placed in an environment of 125° C. for 1000 hours. An ESR value ($X_1$) (mΩ) of the electrolytic capacitor after 1000 hours have elapsed was measured by the same method as described above. An ESR change rate was determined from the following equation.

ESR change rate=$X_1/X_0$

Table 2 shows evaluation results. In Table 2, the initial ESR is shown as a relative value with the initial ESR of the electrolytic capacitor B1 of Comparative Example 1 taken as 100.

TABLE 1

| | Additive agent | | | |
|---|---|---|---|---|
| | Material | Weight average molecular weight | Introduction amount of acid groups | Content ratio (parts by mass with respect to 100 parts by mass of carbon material) |
| A1 | Phenol sulfonic acid novolac resin | 30,000 | 100 | 25 |
| A2 | Polyacrylic acid | 25,000 | 100 | 25 |
| A3 | Polystyrenesulfonic acid | 100,000 | 100 | 25 |
| A4 | Polyvinylsulfonic acid | 100,000 | 100 | 25 |
| A5 | Phenol sulfonic acid novolac resin | 30,000 | 100 | 13 |
| A6 | Phenol sulfonic acid novolac resin | 30,000 | 100 | 10 |
| A7 | Phenol sulfonic acid novolac resin | 30,000 | 100 | 5 |
| A8 | Phenol sulfonic acid novolac resin | 30,000 | 100 | 50 |
| A9 | Phenol sulfonic acid novolac resin | 30,000 | 100 | 100 |
| A10 | Phenol sulfonic acid novolac resin | 30,000 | 100 | 1000 |
| A11 | Phenol sulfonic acid novolac resin | 90,000 | 100 | 25 |
| A12 | Phenol sulfonic acid novolac resin | 8,000 | 100 | 25 |
| A13 | Phenol sulfonic acid novolac resin | 30,000 | 100 | 25 |
| | Carboxymethyl cellulose | 100,000 | 30 | 6 |
| A14 | Phenol sulfonic acid novolac resin | 90,000 | 100 | 25 |
| | Carboxymethyl cellulose | 100,000 | 30 | 6 |
| A15 | Phenol sulfonic acid novolac resin | 8,000 | 100 | 25 |
| | Carboxymethyl cellulose | 100,000 | 30 | 6 |
| A16 | Phenol sulfonic acid novolac resin | 30,000 | 100 | 25 |
| | Carboxymethyl cellulose | 15,000 | 30 | 6 |
| A17 | Phenol sulfonic acid novolac resin | 30,000 | 100 | 25 |
| | Carboxymethyl cellulose | 40,000 | 30 | 6 |
| A18 | Phenol sulfonic acid novolac resin | 30,000 | 100 | 25 |
| | Carboxymethyl cellulose | 70,000 | 30 | 6 |
| A19 | Phenol sulfonic acid novolac resin | 30,000 | 100 | 25 |
| | Polyvinyl alcohol | 3,000 | — | 6 |
| A20 | Phenol sulfonic acid novolac resin | 30,000 | 100 | 25 |
| | Carboxymethyl cellulose | 100,000 | 30 | 2 |
| A21 | Phenol sulfonic acid novolac resin | 30,000 | 100 | 25 |
| | Carboxymethyl cellulose | 100,000 | 30 | 4 |
| A22 | Phenol sulfonic acid novolac resin | 30,000 | 100 | 25 |
| | Carboxymethyl cellulose | 100,000 | 30 | 8 |
| B1 | p-phenolsulfonic acid | — | — | 25 |
| B2 | p-toluenesulfonic acid | — | — | 25 |
| B3 | Carboxymethyl cellulose | 100,000 | 30 | 6 |
| B4 | Carboxymethyl cellulose | 100,000 | 30 | 13 |

TABLE 2

| | Initial ESR | ESR change rate |
|---|---|---|
| A1 | 85 | 1.5 |
| A2 | 94 | 2.1 |
| A3 | 88 | 1.8 |
| A4 | 87 | 2.1 |
| A5 | 85 | 1.5 |

TABLE 2-continued

| | Initial ESR | ESR change rate |
|---|---|---|
| A6 | 85 | 1.5 |
| A7 | 87 | 1.7 |
| A8 | 85 | 1.5 |
| A9 | 87 | 1.4 |
| A10 | 91 | 1.6 |
| A11 | 87 | 1.5 |
| A12 | 84 | 2.8 |
| A13 | 86 | 1.3 |
| A14 | 86 | 1.3 |
| A15 | 86 | 1.7 |
| A16 | 83 | 2.4 |
| A17 | 85 | 2 |
| A18 | 86 | 1.5 |
| A19 | 89 | 1.6 |
| A20 | 85 | 1.5 |
| A21 | 86 | 1.4 |
| A22 | 88 | 1.3 |
| B1 | 100 | 5.8 |
| B2 | 102 | 7.8 |
| B3 | 100 | 26 |
| B4 | 103 | 20 |

The electrolytic capacitor according to the present invention can suppress deterioration of the conductive polymer contained in the solid electrolyte layer even when the electrolytic capacitor is exposed to a high temperature atmosphere or a high humidity atmosphere, and can suppress an increase in ESR. Thus, the electrolytic capacitor can be used in various applications that require low ESR.

The invention claimed is:

1. An electrolytic capacitor comprising a capacitor element,
the capacitor element including:
an anode body,
a dielectric layer that covers at least a part of the anode body,
a solid electrolyte layer that covers at least a part of the dielectric layer, and
a cathode lead-out layer that covers a part of the solid electrolyte layer, wherein:
the cathode lead-out layer contains a carbon material and a first polymer including an acid group,
the acid group includes at least one selected from the group consisting of a sulfone group, a carboxyl group, and a derivative of the sulfone group or the carboxyl group, and
a content ratio of the first polymer ranges from 1 part by mass to 5000 parts by mass, inclusive, with respect to 100 parts by mass of the carbon material.

2. The electrolytic capacitor according to claim 1, wherein:
a monomer, which corresponds to a repeating unit of the first polymer, includes the acid group, and
a number of the acid group is more than or equal to 50 with respect to 100 monomers.

3. The electrolytic capacitor according to claim 1, wherein a weight average molecular weight of the first polymer ranges from 2,000 to 1,000,000, inclusive.

4. The electrolytic capacitor according to claim 1, wherein the cathode lead-out layer further contains a second polymer different from the first polymer.

5. The electrolytic capacitor according to claim 4, wherein the second polymer is water-soluble.

6. The electrolytic capacitor according to claim 5, wherein the second polymer is a cellulose-based polymer.

7. The electrolytic capacitor according to claim 5, wherein the second polymer is a polyvinyl alcohol.

8. The electrolytic capacitor according to claim 4, wherein a content ratio of the second polymer ranges from 5 parts by mass to 50 parts by mass, inclusive, with respect to 100 parts by mass of the first polymer.

9. The electrolytic capacitor according to claim 1, wherein:
the cathode lead-out layer includes a first conductive layer and a second conductive layer, the first conductive layer covering at least a part of the solid electrolyte layer, the second conductive layer covering at least a part of the first conductive layer, and
the first conductive layer contains the first polymer.

* * * * *